United States Patent [19]

Martin

[11] Patent Number: 5,134,251
[45] Date of Patent: * Jul. 28, 1992

[54] FLEXIBLE HOUSING FOR TRANSMISSION LINES

[75] Inventor: James D. S. Martin, Dundee, Scotland

[73] Assignee: W. L. Gore & Associates, Inc., Newark, Del.

[*] Notice: The portion of the term of this patent subsequent to Nov. 20, 2007 has been disclaimed.

[21] Appl. No.: 531,016

[22] Filed: May 31, 1990

Related U.S. Application Data

[63] Continuation-in-part of Ser. No. 362,212, Jun. 6, 1989, Pat. No. 4,972,048.

[30] Foreign Application Priority Data

Jun. 6, 1988 [GB] United Kingdom ............... 8813365

[51] Int. Cl.⁵ .................... H01B 7/24; H02G 3/04
[52] U.S. Cl. .................... 174/136; 59/78.1; 138/110; 138/120; 138/155; 174/68.3; 174/111; 174/167
[58] Field of Search .............. 174/68.3, 111, 136, 174/167; 59/78.1; 138/110, 120, 155; 191/12 C

[56] References Cited

U.S. PATENT DOCUMENTS

| | | | |
|---|---|---|---|
| 421,781 | 2/1890 | Stoughton | 174/111 |
| 3,060,972 | 10/1962 | Sheldon | 174/111 X |
| 4,972,048 | 11/1990 | Martin | 174/136 |

Primary Examiner—Morris H. Nimmo
Attorney, Agent, or Firm—E. Alan Uebler

[57] ABSTRACT

A flexible housing, for use in protecting one or more transmission lines in a pressurized environment comprises a conduit (10) contained within a protective outer jacekt (16). The conduit (10) is constructed of a plurality of conduit segments (18a and 18b), each segment having an opening (28) therethrough, the segments (18a and 18b) being arranged in series and caused to abut adjacent segments in such a way that the opening (28) through each segment (18a and 18b) is in communication with the openings through each of the adjacent segments so as to provide a passage to contain a microwave transmission line. Each segment (18a and 18b) is flexibly linked to its adjacent segments by coupling means (34).

17 Claims, 4 Drawing Sheets

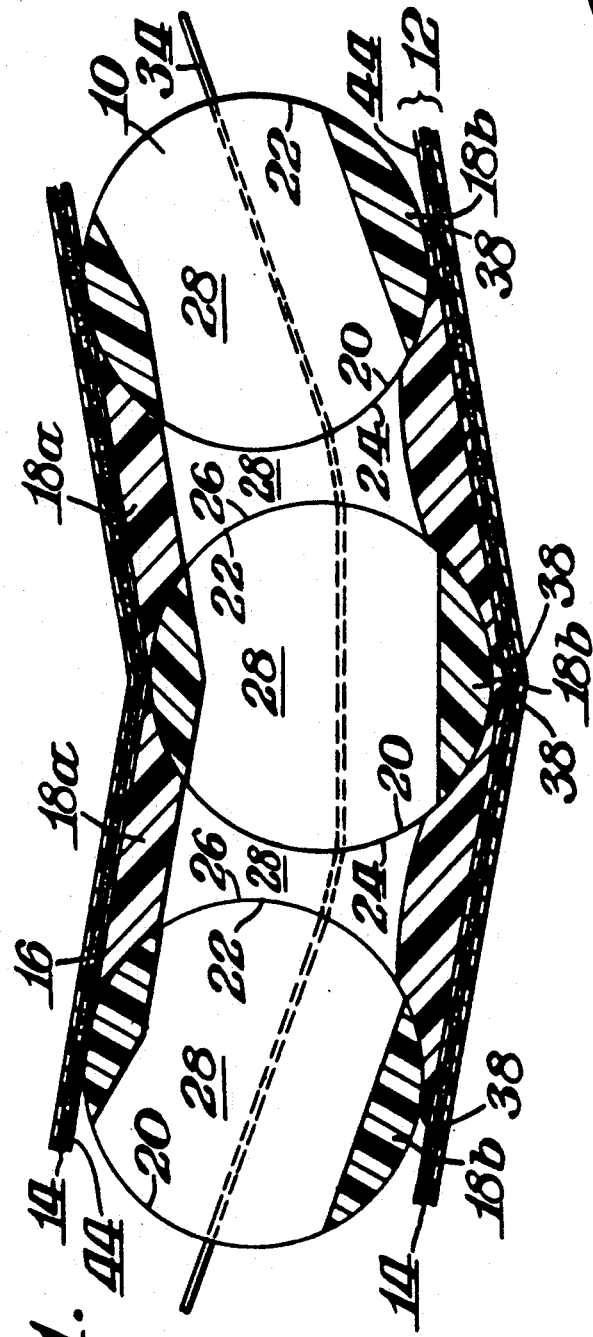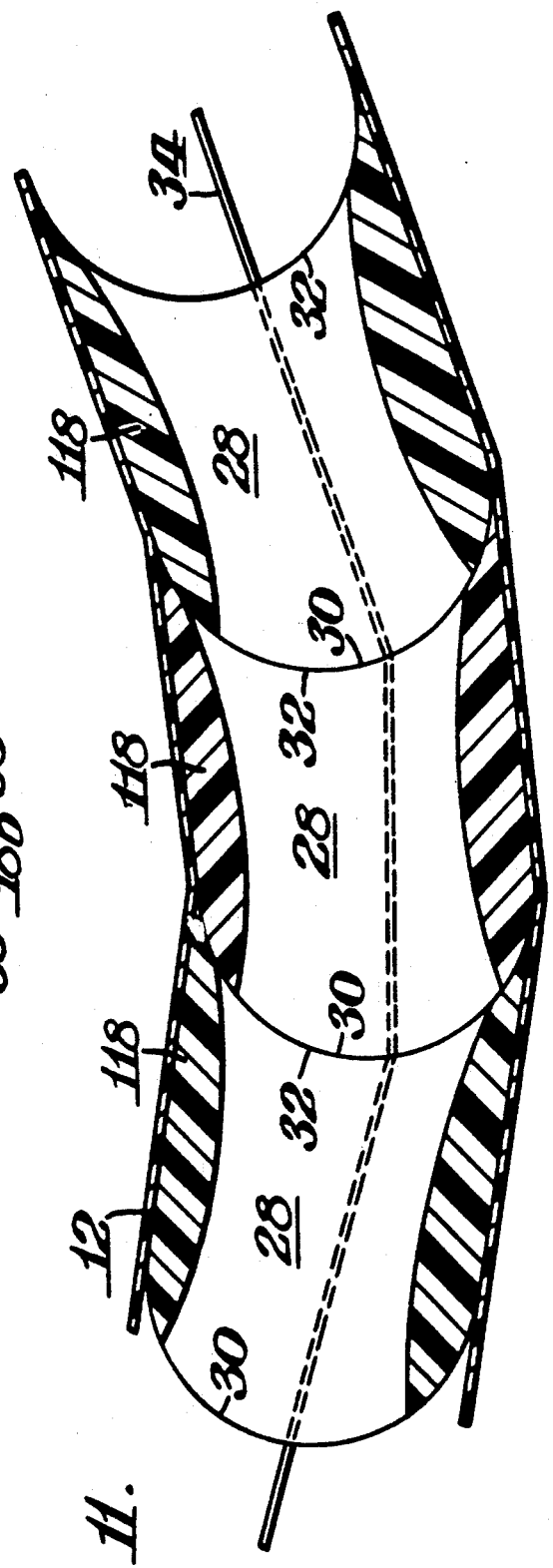

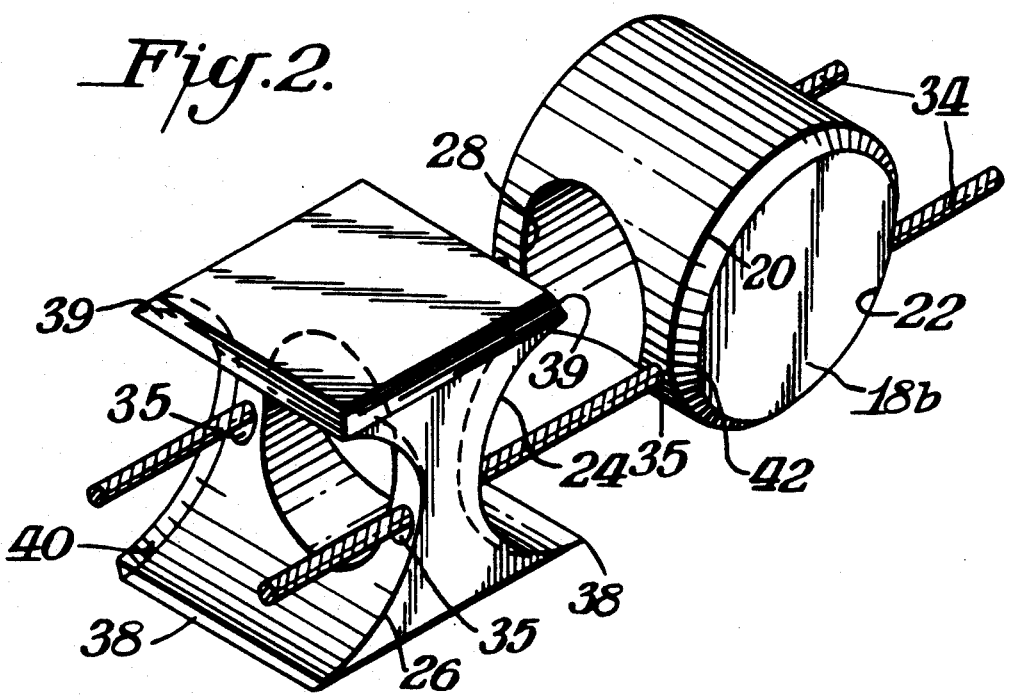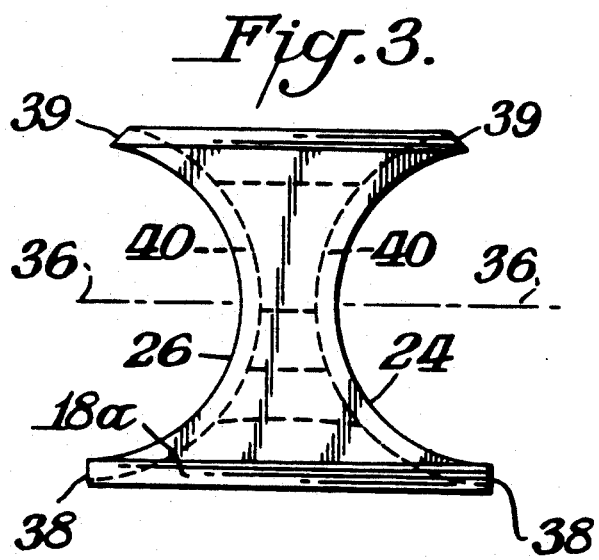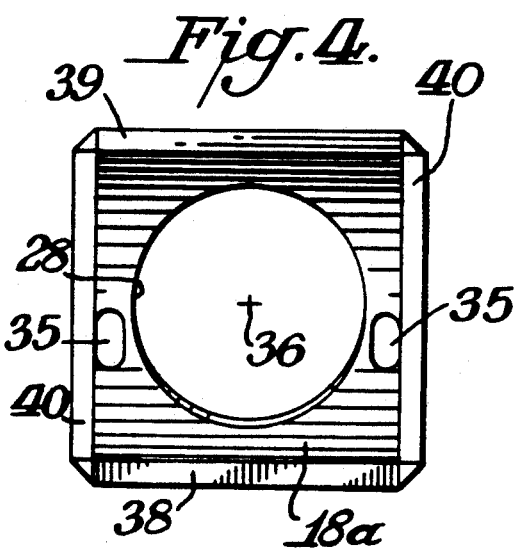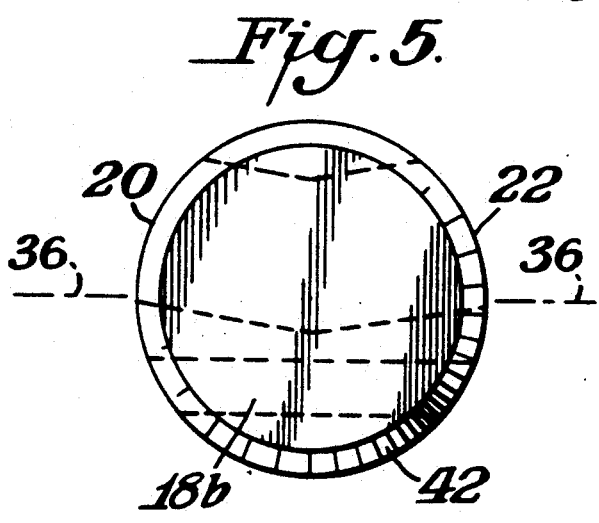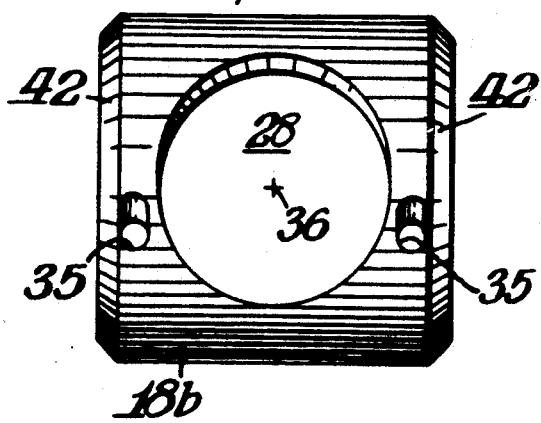

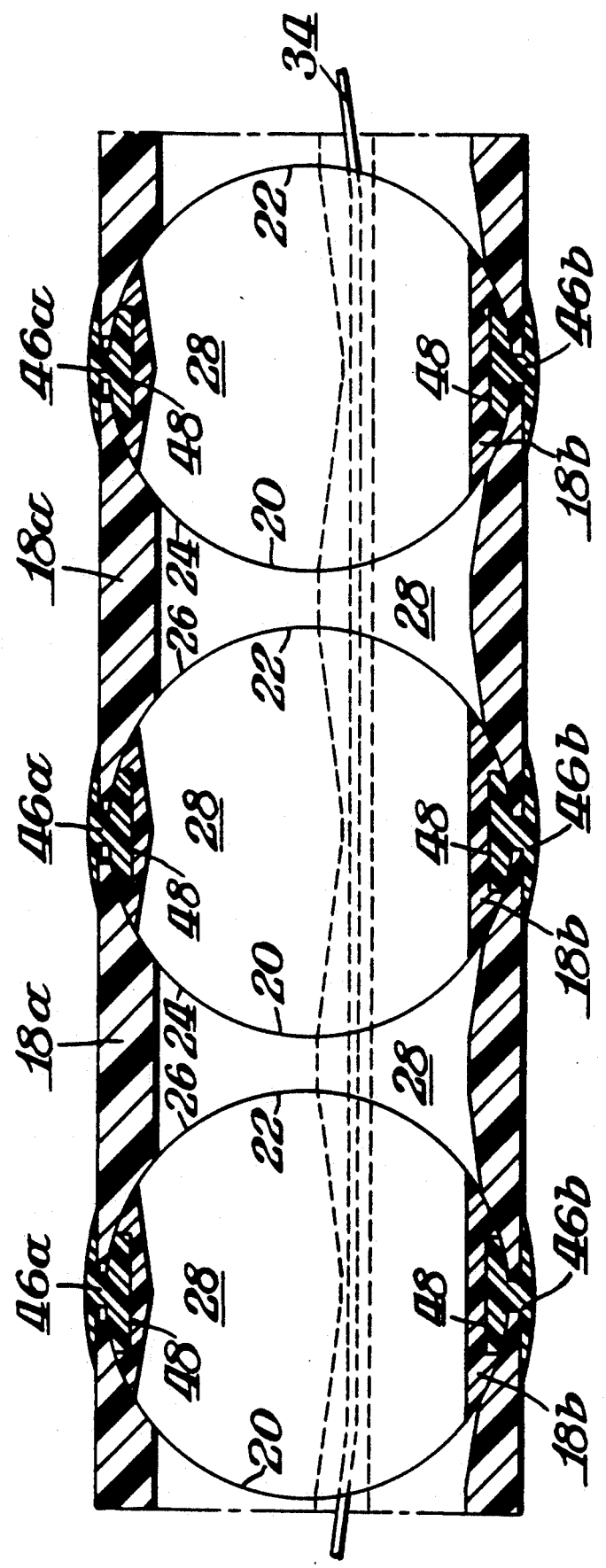

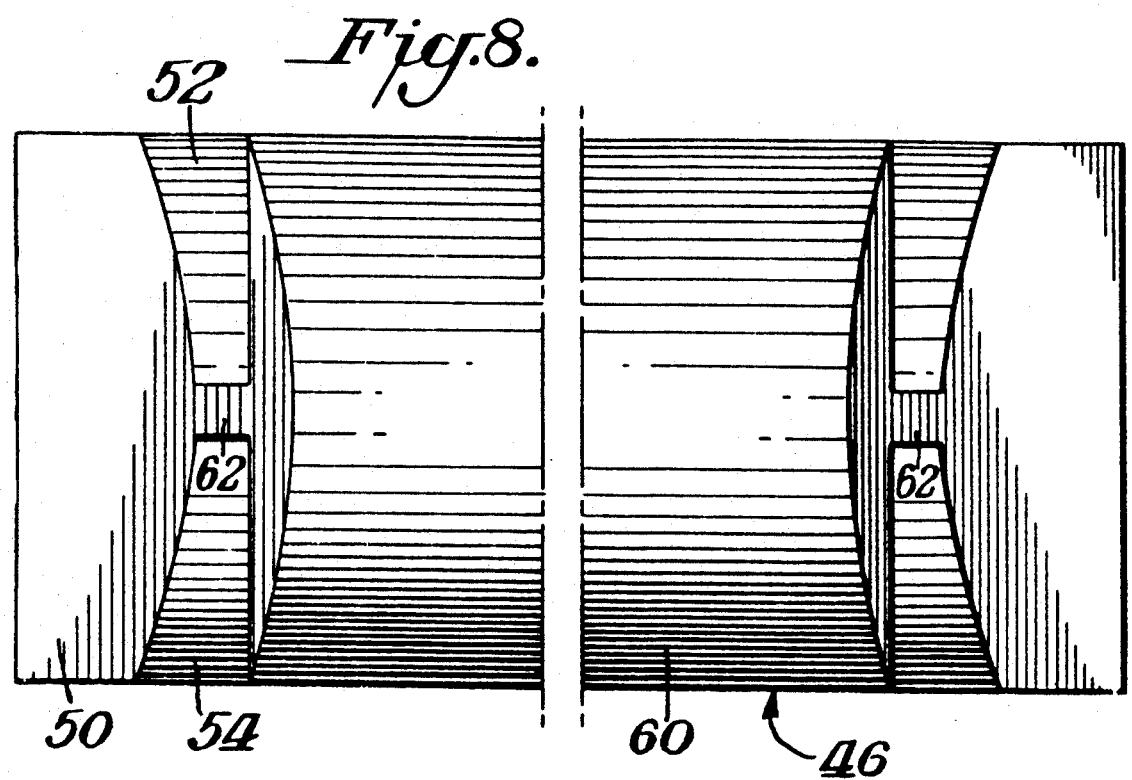
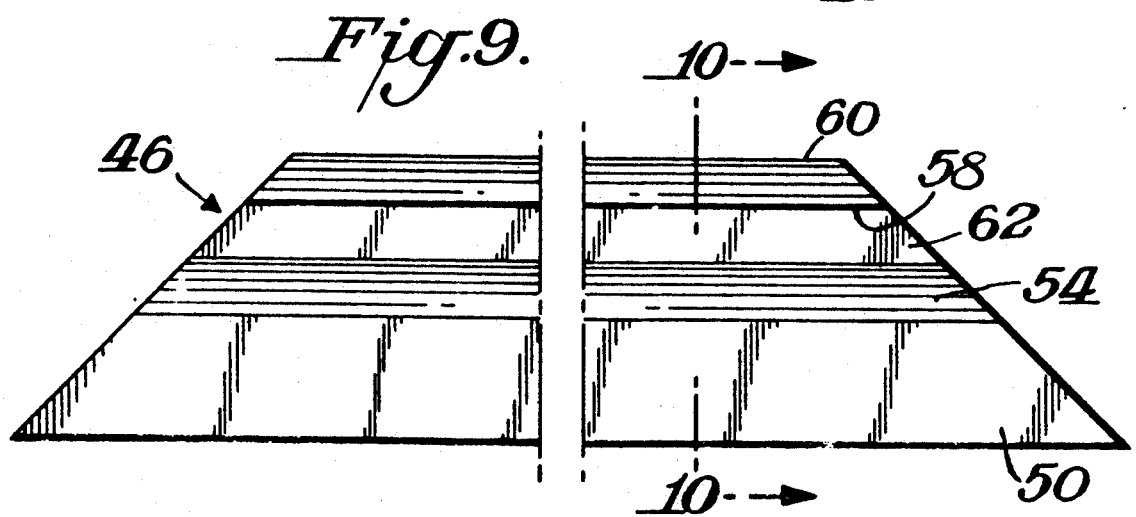
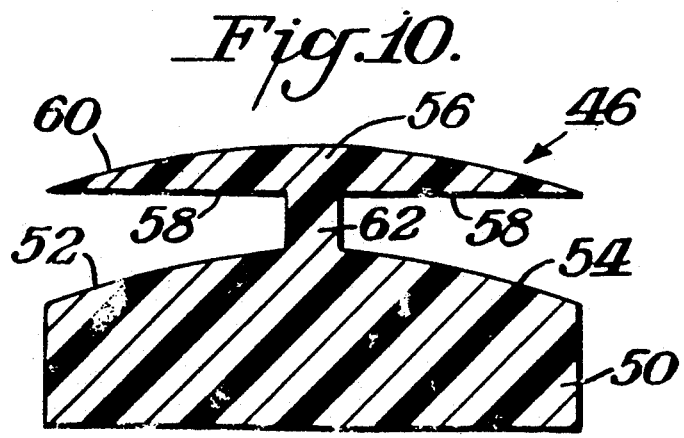

FLEXIBLE HOUSING FOR TRANSMISSION LINES

This application is a continuation-in-part of applicant's earlier application, Ser. No. 07/362,212, filed Jun. 6, 1989, now U.S. Pat. No. 4,972,048, and applicant claims priority under 35 U.S.C. §119 based on his U.K. application No. 8813365, filed Jun. 6, 1988.

The present invention relates to a flexible housing for use in protecting one or more transmission lines particularly microwave transmission lines, in a pressurised environment and, in particular, a hydrostatically pressurised environment.

The invention originates from a requirement for a microwave transmission line to operate within a submarine mast environment. Modern submarine mast design dictates the placement of electronic equipment in an electronics pod at the mast head connected by microwave transmission lines to processing equipment in the hull. This arrangement creates the requirement for a microwave transmission line capable of withstanding a hydrostatic pressure of up to 1000 psi ($6.89 \times 10^6$ Nm$^{-2}$) and yet able to flex through an angle of 180° with a bend radius of 150 mm when the mast head is raised.

In the past, various "wet mast" techniques have involved the ruggedising of coaxial microwave cables so as to limit to an acceptable level the amount of hydrostatic pressure felt by the cable. Often, under such pressure conditions, it is the dielectric within the coaxial cable that absorbs the bulk of the compressive forces, altering the microwave characteristics of the cable. The use of a more rigid dielectric material to overcome the problem of compression under hydrostatic pressure has an adverse effect on cable performance. Furthermore, this technique limits the types of cable which can be used, their number and their application, and, consequently, has a detrimental effect on the performance of the system as a whole.

The above technique also requires the use of some form of cable management system to ensure that the cables hang and remain in a defined position under the various dynamic conditions of the submarine. Each microwave transmission line linking the electronics pod at the mast head with the processing equipment in the hull will contain a flexure through 180°, the point of flexure being determined by the relative heights of the terminations of the transmission line, and the point of flexure will thus change as the mast is raised. The cable management system not only has to allow for the smooth change in position of the point of flexure, but also has to ensure that the transmission lines are unaffected by the angle of dive of the submarine, which may be of the order of ±10°, or the angle of tilt of the submarine caused by a surface swell and possibly of the order of ±30°.

The present invention is concerned with the provision of a barrier between a pressurised environment and a microwave transmission line, thus enabling the use of cables selected for their microwave characteristics rather than their ability to withstand hydrostatic pressure. This is obviously beneficial to the performance of the system, while the barrier, in the form of a flexible housing, enables the transmission line to withstand far greater hydrostatic pressures than heretofor. The design of the present invention also eliminates the need for a cable management system, thus simplifying the mast design.

According to a first aspect of the present invention, there is provided a flexible housing for use in protecting a transmission line in a pressurised environment comprising a conduit contained within encasing means, the conduit being constructed of a plurality of segments, each conduit segment having an opening therethrough defining a through axis, the segments being arranged in series and caused to abut adjacent segments in such a way that the opening through each segment is in communication with the openings through each of the adjacent segments so as to provide a passage to contain a transmission line, each segment being flexibly linked to its adjacent segments by a pair of flexible ligaments running throughout the length of the conduit and passing in turn through each conduit segment in dedicated channels displaced from the opening therethrough.

According to a second aspect of the present invention, there is provided a flexible housing for use in protecting a transmission line in a pressurised environment comprising a conduit contained within encasing means, the conduit being constructed of a plurality of segments, each conduit segment having an opening therethrough defining a through axis, the segments being arranged in series and caused to abut adjacent segments in such a way that the opening through each segment is in communication with the openings through each of the adjacent segments so as to provide a passage to contain a transmission line, each segment being flexibly linked to its adjacent segments by coupling means and some or all of the conduit segments being provided with a first set of spaced-apart butting surfaces orientated generally perpendicular to the through axis, pairs of said first butting surfaces being caused to abut each other in regions of the conduit spaced from a flexure thereby urging the regions to maintain a straight disposition.

Although the present invention originated from a consideration of the problems of microwave transmission in submarine mast design, protective flexible housings embodying the invention are equally suited to other applications wherein a connection is required within an environment that would be unsuitable for an otherwise unprotected transmission line. Similarly, even though the prior art has been discussed with reference to the use of coaxial cables, it is understood that this is in no way intended to limit the scope of the invention, the present invention being equally applicable to other transmission means.

Flexible housings embodying the invention will now be particularly described by way of example, with reference to the accompanying drawings in which:

FIG. 1 is a cross-sectional view of part of one of the flexible housings;

FIG. 2 is an exploded perspective view of two adjacent conduit segments in the housing of FIG. 1;

FIG. 3 is a lateral view of one of the conduit segments of FIG. 2;

FIG. 4 is an axial view of the conduit segment of FIG. 3;

FIG. 5 is a lateral view of another of the conduit segments of FIG. 2;

FIG. 6 is an axial view of the conduit segment of FIG. 5;

FIG. 7 is a cross-sectional view of part of another of the flexible housings;

FIG. 8 is a top plan view of an insert shown in FIG. 7;

FIG. 9 is a side elevational view of the insert shown in FIG. 8;

FIG. 10 is a detailed cross-sectional view of the insert shown in FIG. 8, taken along line 10—10 of FIG. 9; and FIG. 11 is a cross-sectional view of part of a further one of the flexible housings.

The flexible housing shown in FIG. 1 comprises a conduit 10 and encasing means 12, in turn comprising an inner sleeve 14 and a protective outer jacket 16 and a nylon strip 44. The conduit 10 is constructed of a plurality of conduit segments 18a and 18b the number of segments being determined by the length of housing required, and in the embodiment shown the segments are of one of two configurations. The first configuration is that of conduit segment 18a which is of biconcave cross-section while the second configuration is that of conduit segment 18b, which is of circular cross-section. The segments 18 are arranged in series, the two configurations of conduit segments, 18a and 18b, alternating along the length of the conduit 10, and caused to abut adjacent segments. The cross-sectional radius of the second configuration of conduit segment 18b is of substantially similar value to the radius of curvature of the first configuration 18a so that the convex arcuate surfaces 20 and 22 of the second configuration of conduit segment 18b are received by the concave arcuate surfaces 24 and 26 of the adjacent segments of the first configuration 18a.

Each conduit segment 18, irrespective of configuration, has an opening 28 therethrough, the segments being arranged in series so as to abut adjacent segments in such a way that the opening 28 through each segment is in communication with the openings 28 through each of the adjacent segments. In this way, a passage is provided along the length of the conduit 10 to contain a microwave transmission line, the microwave transmission line being of any suitable form.

In a preferred embodiment, the opening 28 through each segment is flared at opposite ends so as to create larger entrances with which the openings of adjacent segments may be in communication. As a result, the degree of flexure in the conduit may be increased, that is, the bend radius may be decreased, whilst maintaining the openings through adjacent segments in communication with each other and the passage created thereby of sufficient minimum cross-section to contain a transmission line.

Each conduit segment 18a of biconcave cross-section is provided with a first set of oppositely-facing, spaced-apart butting surfaces 38 disposed at edges of the segment to one side of the opening 28, the butting surfaces 38 being generally perpendicular to the through axis 36 of the opening. As may be seen from FIG. 1, when the two configurations of conduit segments, 18a and 18b, are arranged in series alternating along the length of the conduit 10, pairs of oppositely-facing butting surfaces 38 are brought into close proximity with one another, one butting surface of the pair being provided by each of the two segments 18a of biconcave cross-section disposed to either side of a segment 18b of circular cross-section Each conduit segment 18a and 18b is flexibly linked to its adjacent segments by coupling means. As may be most clearly seen in FIG. 2, the coupling means comprise a pair of flexible ligaments 34 running throughout the length of the conduit 10 and passing in turn through each segment 18a and 18b in dedicated channels 35 displaced from the opening 28 therethrough. The flexible ligaments 34 may be terminated by variable tensioning means (not shown) at the terminations of the conduit 10, and preferably tensioned to approximately 133 Newtons (30 lbs force).

In the flexible housing shown in FIG. 1 and in the conduit segments shown in FIGS. 3 to 6, the flexible ligaments 34 are shown passing through each conduit segment at a distance away from the through axis 36 of the opening and nearer the first set of butting surfaces 38. That is, the plane defined by the passage of the two flexible ligaments 34 through a conduit segment does not contain the through axis 36 of the opening 28 of that segment so that the tension in the flexible ligaments acts at a distance from the through axis 36. The effect of a force acting off center of the natural axis of the segments is, in the regions of the conduit 10 away from the point of flexure, to cause the pairs of butting surfaces 38 to abut each other.

Since the butting surfaces are generally perpendicular to the through axis 36, this results in these regions being urged to maintain a straight disposition without recourse to a more elaborate conduit management system analogous to the cable management systems of the prior art. Within the region of the point of flexure, the butting surfaces 38 open out to allow a smoothly curving flexure through 180°, the position of the point of flexure being dependent upon the relative heights of the terminations of the conduit.

The minimum inside bend radius of the flexure is determined by the configuration of a second set of oppositely-facing, spaced-apart butting surfaces 39 provided on the conduit segments 18a of biconcave cross-section. The second set of butting surfaces 39 are similarly disposed at edges of the segment but on opposite sides of the opening 28 to those of the first set 38. However, unlike the first set, the second set of butting surfaces 39 are not spaced so far apart and are inclined to a plane perpendicular to the through axis 36. When the two configurations of conduit segments, 18a and 18b, are arranged in series alternating along the length of the conduit 10, pairs of the second butting surfaces 39, like those of the first 38, are brought into close proximity with one another. In the regions of the conduit 10 away from the point of flexure, pairs of the second butting surfaces 39 do not abut each other since the surfaces are not spaced so far apart as the first and so do not interfere with the straight disposition that the conduit is urged to maintain as a result of the action of pairs of the first butting surfaces 38. Within the region of the point of flexure, however, pairs of these second butting surfaces 39 are urged into contact with one another until the inclined surfaces abut each other preventing further movement of the segments against each other. Thus, the maximum angle at which one segment 18a of biconcave cross-section may be disposed relative to a segment of similar cross-section located adjacent to an adjacent segment 18b of circular cross-section is determined by the angle of inclination of the surfaces 39 and hence gives rise to a minimum inside bend radius.

Owing to the design of the conduit segments 18 the flexible housing is only capable of flexure in one plane. The housing is additionally urged to maintain a planar disposition by providing the arcuate surface of one conduit segment with guide surfaces while the arcuate surface of the adjacent conduit segment abutting thereagainst is provided with means to cooperate with the guide surfaces to prevent relative lateral movement between the segments. The guide surfaces and cooperating means may be of any convenient design, for example a ridge on the lateral edges of one segment received in grooves of the adjacent segment. In the embodiment shown in FIGS. 3 to 6 the guide surfaces are in the form of a 45° radial abutment 40 while the means cooperating therewith is a 45° radial chamfer 42. In the embodiment shown, the radial abutment is applied to the segment of biconcave cross-section and the radial chamfer is applied to the segment of circular cross-section, although it is understood that these features may be applied in the opposite sense.

The conduit is enclosed within an inner sleeve 14 of preferably shrink-fit material which is in turn contained within an outer protective jacket 16. The material of the outer protective jacket is dependent upon the application of the housing and the characteristics of the environment against which it is to offer protection but may typically be of extruded polyurethane. The material of the inner sleeve is selected to have similar thermal expansion properties to those of the outer protective jacket as well as having a low coefficient of friction and some elastic properties. The preferred material for the inner sleeve 14 is expanded polytetrafluoroethylene. The inner sleeve 14 prevents the adherence of the outer jacket 16 to the assembled conduit segments thus allowing the movement of the jacket 16 over the conduit segments during flexure. The inner sleeve 14 is itself prevented from being pinched between abutting segments during flexure and in particular between pairs of the first or second set of butting surfaces 38 or 39 of the segments 18a of biconcave cross-section, by strips 44, preferably of nylon, extending the length of the conduit and placed between the inner sleeve 14 and the conduit 10.

In the housing shown in FIG. 7, the strips 44 are replaced by inserts 46 received within grooves 48 of the conduit segments 18b of circular cross-section. As may be seen from FIGS. 8-10, each insert 46 comprises a base section 50 for reception within one of the grooves 48, the base section 50 having shoulder surfaces 52 and 54 continuous respectively with the convex arcuate surfaces 20 and 22 of the conduit segment in which the insert 46 is received, and an external portion 56 having inner and outer surfaces 58 and 60, the external portion 56 being connected to the base section 50 by means of a connecting member 62.

In the embodiment shown in FIG. 7, each conduit segment 18b of circular cross-section is provided with two grooves 48 orientated perpendicular to the through axis 36 of the conduit, the inserts 46 received thereby being designated as inner and outer bend radius inserts, 46a and 46b, respectively. As may be seen, the configuration of the inserts is such as to receive pairs of a first or second set of butting surfaces 38 or 39 within the openings created by respective shoulder surfaces 52 or 54, the connecting member 62 and the inner surface 58 of external portion 56. Hence, the convex arcuate surfaces 20 and 22 of the conduit segments 18b of circular cross-section may be received by the concave arcuate surfaces 24 and 26 of the adjacent segments 18a of biconcave cross-section as previously described. When the two configurations of conduit segments, 18a and 18b, are arranged in series in this way with the segment configurations alternating along the length of the conduit 10, the external portions 56 of inserts 46a and 46b overlie a portion of each of the two adjacent conduit segments 18a of biconcave cross-section in the region of pairs of a second or first set of butting surfaces, 39 or 38 respectively, preventing the inner sleeve 14 of the conduit encasing means 12 from being pinched therebetween.

It will be appreciated that in this form of the housing, the conduit management system operates in a manner similar to that previously described. The conduit segments 18a and 18b in the regions of the conduit 10 away from the point of flexure are still urged, as before, to maintain a straight disposition as a result of the tension in the ligaments 34 acting at a distance from the through axis 36 of the conduit. In the housing under consideration, however, pairs of the first butting surfaces 38 abut the connecting member 62 of the outer bend radius inserts 46b, the connecting member 62 being generally perpendicular to the through axis 36 of the conduit. As before, within the region of the point of flexure, the butting surfaces open out to allow a smoothly curving flexure but not sufficiently as to be no longer received within the openings created by the shoulder surfaces 52 or 54, the connecting member 62 and the inner surface 58 of the external portion 56 of the insert. The outer surface 60 of the external portion 56 of the insert 46b is provided with a curved profile so as to optimize the smoothly curving profile of the conduit 10 in the region of the flexure and minimize the possibility of damaging the inner sleeve 14.

Similarly, the provision of inserts 46 in place of the strips 44 does not affect the possibility of determining the minimum inside bend radius of the flexure. As has been previously described, the second butting surfaces 39 provided on the conduit segments 18a of biconcave cross-section are not spaced as far apart as those of the first so that in the regions of the conduit 10 away from the flexure, like that shown in FIG. 7, pairs of the second butting surfaces 39 do not abut the connecting member 62 of the inner bend radius inserts 46a. Within the region of the point of flexure, however, pairs of these second butting surfaces 39 are urged toward the connecting member 62 until they abut thereagainst preventing further movement of the segments against each other, this movement being facilitated by the fact that the external portion 56 of each inner bend radius insert 46a is capable of undergoing flexion. Thus, as before, the angle at which one segment 18a of biconcave cross-section may be disposed relative to a segment of similar cross-section and located adjacent an adjacent segment 18b of circular cross-section is limited, giving rise to a minimum inside bend radius of the flexure. In this particular embodiment, however, that limitation is determined by the dimensions of the connecting member 62 of the inner bend radius insert 46a that is received within a groove 48 of the adjacent segment of circular cross section.

Furthermore, it will be appreciated by those skilled in the art that the inner and outer bend inserts 46a and 46b may be of identical configuration for ease of manufacture or may be of differing configuration so as to optimize their slightly differing functions, in particular the connecting member 62 of the inner bend radius inserts 46a may be provided with surfaces inclined to a plane perpendicular to the through axis 36 so as to mate with the inclined surfaces of the second butting surfaces 39. Alternatively, the inserts 46 and the segment 18b of circular cross-section 18b by which they are received may be made as one piece, thus dispensing with an assembly operation during the production stage of the conduit.

In the housing shown in FIG. 11, the plurality of segments that comprise the conduit 10 are of a single configuration 118. As in the first embodiment described above, the segments 118 are provided with an opening 28 therethrough and arranged in series and caused to abut adjacent segments in such a way that the opening 28 through each segment 118 is in communication with the openings through each of the adjacent segments. In contrast to the previous embodiment, however, each segment 118 is provided with a convex arcuate surface 30 and a concave arcuate surface 32, each arcuate surface being of substantially similar radius of curvature so that the convex arcuate surface 30 of one segment may be received by the concave arcuate surface 32 of an adjacent segment.

It will be appreciated by those skilled in the art that the features such as the provision of flexible ligaments and butting surfaces that comprise the conduit management system, the provision of guide surfaces and means cooperating therewith preventing relative lateral movement between the conduit segments and the provision of overlying strips, preferably of nylon, to prevent the inner sleeve of the encasing means from being pinched between abutting segments during flexure all of which have been earlier described, are applicable in an analogous manner to the embodiment shown in FIG. 11.

I claim:

1. A flexible housing for use in protecting a transmission line in a pressurised environment comprising a conduit contained within encasing means, the conduit being constructed of a plurality of segments, each conduit segment having an opening therethrough defining a through axis, the segments being arranged in series and caused to abut adjacent segments in such a way that the opening through each segment is in communication with the openings through each of the adjacent segments so as to provide a passage to contain a transmission line, each segment being flexibly linked to its adjacent segments by coupling means, wherein at least some of the conduit segments are provided with a first set of oppositely-facing, spaced-apart, butting surfaces orientated generally perpendicular to the through axis, pairs of said first butting surfaces being caused to abut each other in regions of the conduit spaced from a flexure, thereby urging the regions to maintain a straight disposition, and wherein adjacent conduit segments are provided with guide surfaces and means cooperating therewith so as to prevent relative lateral movement between the segments.

2. A flexible housing in accordance with claim 1 wherein the coupling means comprise a pair of flexible ligaments running throughout the length of the conduit and passing through each conduit segment in turn.

3. A flexible housing in accordance with claim 2 wherein the pair of flexible ligaments passing through each conduit segment define a plane that does not contain the through axis of the opening in the conduit segment so that a tension generated by the pair of ligaments acts at a distance away from the through axis.

4. A flexible housing in accordance with claim 2 wherein the flexible ligaments are tensioned to approximately 133 Newtons (30 lbs force).

5. A flexible housing in accordance with claim 1 wherein the abutment of adjacent conduit segments is such that a convex arcuate surface of one segment is received by a concave arcuate surface of an adjacent segment of corresponding curvature.

6. A flexible housing in accordance with claim 1 wherein the opening through each conduit segment is flared at opposite ends.

7. A flexible housing in accordance with claim 1 wherein at least some of the conduit segments are provided with a second set of oppositely-facing, spaced-apart butting surfaces orientated so as to be inclined to a plane perpendicular to the through axis, pairs of the second set of abutting surfaces being caused to abut each other in the region of a flexure in the conduit giving rise to a minimum inside bend radius.

8. A flexible housing in accordance with claim 1 wherein the guide surfaces comprise 45° radial abutments and the means cooperating therewith comprise 45° radial chamfers.

9. A flexible housing in accordance with claim 1 wherein the encasing means comprise an inner sleeve and an outer protective jacket, the inner sleeve being provided between the plurality of conduit segments and the protective outer jacket to prevent the adhesion of the jacket to the conduit segments.

10. A flexible housing in accordance with claim 1, wherein the conduit is provided with at least one nylon strip to prevent the pinching of the encasing means between abutting surfaces during any relative movement of adjacent conduit segments.

11. A flexible housing in accordance with claim 1 wherein at least some of the conduit segments are provided with inserts to prevent the pinching of the encasing means between abutting surfaces during any relative movement of adjacent conduit segments.

12. A flexible housing in accordance with claim 11 wherein the conduit segments and the inserts with which they are provided are made as one piece.

13. A flexible housing in accordance with claim 1 having a protective outer jacket of extruded polyurethane.

14. A flexible housing in accordance with claim 1 wherein the plurality of segments which comprise the conduit are of one of two different configurations, the configurations alternating along the length of the flexible housing; the first segment configuration being a segment of biconcave cross-section and the second segment configuration being of circular cross-section, the cross-sectional radius of the second configuration being substantially equal to the cross-sectional radius of curvature of the first configuration so that the second configuration may be received thereby.

15. A flexible housing in accordance with claim 14 wherein the conduit segments of biconcave cross-section are provided with the said first set of oppositely-facing, spaced-apart butting surfaces.

16. A flexible housing in accordance with claim 14 wherein the conduit segments of biconcave cross-section are provided with the second segment configuration of oppositely-facing, spaced-apart butting surfaces.

17. A flexible housing in accordance with claim 14 wherein the conduit segments of circular cross-section are provided with inserts to prevent the pinching of the encasing means between abutting surfaces.

* * * * *

UNITED STATES PATENT AND TRADEMARK OFFICE
CERTIFICATE OF CORRECTION

PATENT NO. : 5,134,251

DATED : July 28, 1992

INVENTOR(S) : James D. S. Martin

It is certified that error appears in the above-identified patent and that said Letters Patent is hereby corrected as shown below:

On the Title page, item [57],

In the Abstract, line 4, please change "jacekt" to --jacket--.

In col. 1, lines 23-24, please change Nm31 2) to --Nm-2)--.

Signed and Sealed this

Seventeenth Day of August, 1993

Attest:

BRUCE LEHMAN

Attesting Officer

Commissioner of Patents and Trademarks